(12) United States Patent
Bennett et al.

(10) Patent No.: US 11,625,765 B2
(45) Date of Patent: Apr. 11, 2023

(54) REAL TIME ORDER AND ACTIVATION PROCESSING SYSTEM

(71) Applicant: Walmart Apollo, LLC, Bentonville, AR (US)

(72) Inventors: Frank Bennett, McLean, VA (US); Tim Weisbrod, Arlington, VA (US); Neil Ryan, Broadlands, VA (US); Vic Hugo, Arlington, VA (US); Andy Zeinfeld, Ashburn, VA (US); Kevin O'Riordan, Washington, DC (US); Grant Yoder, Arlington, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 124 days.

(21) Appl. No.: 17/341,247

(22) Filed: Jun. 7, 2021

(65) Prior Publication Data
US 2021/0295418 A1    Sep. 23, 2021

Related U.S. Application Data

(63) Continuation of application No. 16/656,106, filed on Oct. 17, 2019, now abandoned, which is a
(Continued)

(51) Int. Cl.
*G06Q 30/06* (2012.01)
*G06Q 30/0601* (2023.01)
*G06Q 20/40* (2012.01)

(52) U.S. Cl.
CPC ......... *G06Q 30/0637* (2013.01); *G06Q 20/40* (2013.01); *G06Q 20/401* (2013.01);
(Continued)

(58) Field of Classification Search
CPC .......... G06Q 30/0601; G06Q 30/0613; G06Q 30/0631; G06Q 30/0637; G06Q 20/40; G06Q 20/401; G06Q 20/4016
(Continued)

(56) References Cited

U.S. PATENT DOCUMENTS

| 5,732,400 A | 3/1998 | Mandler |
| 7,689,487 B1 | 3/2010 | Britto |

(Continued)

FOREIGN PATENT DOCUMENTS

| WO | WO-9728665 A1 * | 8/1997 | ............ H04W 8/265 |
| WO | 2001015096 | 3/2001 | |

OTHER PUBLICATIONS

Stone, Suzanne R. McClatchy-, "Verizon iPhone preorders begin"; Tribune Business News [Washington] Feb. 3, 2011, retrieved from Dialog on Dec. 2, 2022 (Year: 2011).*

(Continued)

*Primary Examiner* — Yogesh C Garg
(74) *Attorney, Agent, or Firm* — Fitch, Even, Tabin & Flannery LLP

(57) ABSTRACT

Methods and systems are provided for utilizing interactive UI dialogs to resolve issues that may arise during the real-time ordering and activation of wireless products and services while a user is engaged during their session. The interactive UI dialogs may provide a customer with an opportunity to provide information, make decisions or trigger additional steps during the real time order.

12 Claims, 12 Drawing Sheets

Related U.S. Application Data continuation of application No. 15/661,896, filed on Jul. 27, 2017, now abandoned, which is a continuation of application No. 13/836,598, filed on Mar. 15, 2013, now abandoned.

(52) U.S. Cl.
CPC ..... *G06Q 20/4016* (2013.01); *G06Q 30/0601* (2013.01); *G06Q 30/0613* (2013.01); *G06Q 30/0631* (2013.01); *G06Q 30/0635* (2013.01)

(58) Field of Classification Search
USPC .............................................. 705/26.82, 26.1
See application file for complete search history.

(56) References Cited

U.S. PATENT DOCUMENTS

| | | |
|---|---|---|
| 8,185,457 B1 | 5/2012 | Bear |
| 8,606,638 B2 | 12/2013 | Dragt |
| 2002/0186845 A1 | 12/2002 | Dutta |
| 2009/0259553 A1 | 10/2009 | Carroll |
| 2010/0009332 A1 | 1/2010 | Yaskin |
| 2010/0042510 A1 | 2/2010 | Zeinfeld |
| 2011/0276468 A1 | 11/2011 | Lewis |
| 2012/0028604 A1 | 2/2012 | Walden |
| 2012/0142310 A1 | 6/2012 | Pugh |
| 2012/0143864 A1 | 6/2012 | Quigley |
| 2012/0173385 A1 | 7/2012 | Fan |
| 2012/0197762 A1* | 8/2012 | Steinberg ............... G06Q 20/10 705/26.82 |
| 2014/0067672 A1 | 3/2014 | Dheer |
| 2015/0348021 A1 | 12/2015 | Rader |

OTHER PUBLICATIONS

U.S. Appl. No. 13/836,598; Office Actoin dated Nov. 5, 2015.

U.S. Appl. No. 13/836,598; Office Actoin dated Nov. 7, 2016.

U.S. Appl. No. 13/836,598; Notice of Allowance dated Jul. 28, 2017.

U.S. Appl. No. 15/661,896; Notice of Allowance dated Jul. 17, 2019.

U.S. Appl. No. 16/656,106; Notice of Allowance dated Mar. 5, 2021.

\* cited by examiner

FIG. 3

SHOPPING CART

Service Plan       Remove Service Plan and Phone ⊗

T-Mobile authorized dealer    Classic Individual Unlimited Plus
for Arlington, VA 22205

Need more minutes?  Change Plan

| Billed Separately by : T-Mobile | |
|---|---|
| Service Plan | $79.99 per month |
| One-time Activation Fee (per line) | $35.00 |
| Visual Voicemail | $0.00/month |
| Unlimited Plus - Unlimited data with 2GB of high-speed data | $0.00/month |

Edit Features

Your New Wireless Phone Change Phone    Regular Price   Your Price

Samsung Galaxy S II 4G    remove   ~~$649.00~~   $179.99

You have not selected <u>Device Protection Service</u> for this phone.
☐ Yes, Please add this service for $69.99 for one year with NO deductible <u>No Activation Fee on All Lines Ordered</u>     $0.00

Subtotal    $179.99
Estimated Taxes (for zip code 22205)    $9.00
You Pay Today    $188.99

Your Order Qualifies for FREE Shipping by FedEx! Select Next Business Day FedEx shipping at checkout

[ Empty Cart ]   [ Continue ]     [ Checkout>> ]

( 📞 ORDER BY PHONE )

FIG. 5

Sam's Club — Savings Made Simple

View Receipt
FAQs
Our Process

| Customer Name: | Sales Associate: |
|---|---|
| John Smith | Jane Doe |
| View All Pre-Approvals | Store #: |
| Clear | Jane Doe |

Hello Renee (Sign Out)
Address:
123 Main St.
Arlington, VA 22205

Order Number: 402263381 on 01/05/2012
for Renee Clark - rclark@rebid.com (Update)
View Receipt | View Shipping Status Order Received ✓ — Carrier Approval ✓ — Order Validation ✓ — Shipped ✓

Great News! Your phone has been activated.
Thank you for shopping with us.

Account 1

Cancel an Item

| | STATUS | PHONE NUMBER | DATE OF SERVICE |
|---|---|---|---|
| DROID X2 by MOTOROLA | Carrier Approved ❓ | 703-555-1212 | 4/15/2012 |

CAD2

Order Verification — Close ⊗

T··Mobile··
*authorized dealer*

Thank you for shopping with us!

T-Mobile was not able to approve your order with the information you provided, and is now requesting that we verify the following information again so they can approve your order.

Please review your order details below and make any necessary changes in the space provided. Thank you.

Address 1:* [                    ] ☐ CONFIRM
          Previous Entry: 555 Main St.

Address 2: [                    ]

City:*    [                    ] ☐ CONFIRM
          Previous Entry: Arlington

State:*   [ Select from list... ▼ ] ☐ CONFIRM
          Previous Entry: VA

ZipCode:* [                    ] ☐ CONFIRM
          Previous Entry: 22205

Have you lived at the above ○ Yes ○ No
address for at least two years?*

[ SUBMIT >> ]

---

702

Order Verification — Close ⊗

T··Mobile··
*authorized dealer*

Thank you for shopping with us!

T-Mobile was not able to approve your order with the information you provided, and is now requesting that we verify the following information again so they can approve your order.

Please review your order details below and make any necessary changes in the space provided. Thank you.

Address 1:* [ 123 Main St.       ] ☑ CONFIRM
          Previous Entry: 555 Main St.

Address 2: [                    ]

City:*    [                    ] ☑ CONFIRM
          Previous Entry: Arlington

State:*   [ Virginia           ▼ ] ☑ CONFIRM
          Previous Entry: VA

ZipCode:* [ 22205              ] ☑ CONFIRM
          Previous Entry: 22205

Have you lived at the above ● Yes ○ No
address for at least two years?*

[ SUBMIT >> ]

Hello Johnny (Sign Out)
Shipping Address:
123 Main St.
Apt. 4
Arlington, VA 22205

Order Number: 568564566 on 01/09/2012
for Johnny FatFinger - jfatfinger@rebid.com (Update)
View Receipt | View Shipping Status

| Order Received | Carrier Approval | Order Validation | Shipped |

We are processing your payment.
≫≫≫≫≫≫≫►►≫≫≫≫≫≫≫≫≫

SHIPMENT 1
Signature Required
Estimated ship date: 1/10/2012, pending order validation
Estimated delivery date: TBD

| | STATUS | PHONE NUMBER | DATE OF SERVICE ❓ |
|---|---|---|---|
| Samsung Galaxy S II 4G | Awaiting Carrier Approval ❓ | N/A | To be scheduled |

Cancel an Item

Shipping Status
View Receipt
FAQs
Satisfaction Guarantee
Our Process
Contact Us

ENHANCE YOUR PHONE!
(Selecting will not disrupt your order status)

Device Protection
- Peace of mind against damage or theft of your new phone

PROR01

REAL TIME ORDER AND ACTIVATION PROCESSING SYSTEM

CROSS REFERENCE TO RELATED APPLICATIONS

This application is a continuation of U.S. patent application Ser. No. 16/656,106, filed Oct. 17, 2019, which is a continuation application of U.S. patent application Ser. No. 15/661,896, filed Jul. 27, 2017, which is a continuation application of U.S. patent application Ser. No. 13/836,598, filed Mar. 15, 2013, and the disclosures of which are incorporated by reference herein in their entirety.

FIELD OF THE INVENTION

The present invention relates generally to the fields of Software as a Service (SaaS) applications and electronic commerce for the purchase and activation of wireless devices, wireless services and/or accessories. More specifically, the invention relates to systems and methods for providing an interactive issue resolution dialog prompt to address issues that arise during customer interactions with a real-time order processing system while the customer is engaged.

BACKGROUND OF THE INVENTION

Wireless service providers are constantly racing to provide customers with the latest wireless devices, wireless service plans and/or accessories associated with wireless devices or wireless service plans ("Wireless Product"). Popular mechanisms for offering these Wireless Products to customers are via the use of purchase and activation portals ("portal") that may be accessible online or via terminals located in retail stores. Before customers decide to purchase, upgrade or renew (collectively "Purchase") Wireless Products, they are often interested to find out whether they are eligible for an upgrade to their existing Wireless Products or whether they meet a wireless carrier's eligibility for new Wireless Products. For example, conventionally, if a customer such as a post-paid customer (customers that receive monthly bills for the phone service, unlike pre-paid customers, who must pay for their service first before their phones will work) wants to determine their eligibility for new Wireless Products, they may have to select a particular wireless carrier; contact the select wireless carrier; provide the wireless carrier's customer service representative ("CSR") with the customer's appropriate information, including the customer's name, address, Social Security number and driver's license (or state ID) number; receive a response from the CSR, after the CSR runs the customer's credit to determine whether the customer will require a deposit to open a new line of service or whether the customer is approved for the Wireless Product. At this point, the customer may then select a desired Wireless Product for purchase from the CSR. Conventional systems for the purchase of Wireless Products may provide a single wireless carrier pre-approval while customers are logged on to their websites prior to orders for Wireless Products being submitted. These conventional systems may also prevent orders from being submitted if wireless carrier systems are unavailable. These conventional systems may also process orders for Wireless Products after a customer has disengaged or logged off from the online portal or if their session has ended. Any issues that arise from these orders that may require the intervention of a CSR may necessitate the CSR to contact the customer via a telephone call, email or letter to resolve the issues. This often leads to delays in shipment of the Wireless Products, increased customer service inquires and costs and a reduction in the number of Wireless Products that may be activated.

SUMMARY OF THE INVENTION

The invention provides a Real-Time Approval and Order Processing ("RTOP") system. RTOP provides a UI with interactive issue resolution dialogs that allow a customer to provide information, make decisions and/or trigger additional steps in RTOP workflow while the customer is engaged. RTOP may also provide the ability to process approval immediately after orders are submitted by a customer. RTOP can also accept orders for processing in the future that are submitted when the third party systems are unavailable. Any orders received by RTOP while the third-party systems are unavailable may be automatically processed once these third-party systems are available. After processing these orders, RTOP may send appropriate notifications to customers who placed these orders.

Embodiments of the present invention may include a system for providing an interactive real time wireless carrier approval and ordering program for wireless products. The system includes a memory coupled to a processor; the processor operable to execute a program; the program stored in the memory and executable by the processor, the program being operable to providing a database of available wireless products from a plurality of wireless service providers for selection by a customer; receiving an order with an indication of a selected wireless product from the available wireless products via a web browser; storing the order in a database; validating the stored order with one or more validation routines; transmitting the validated order to one or more systems for processing; generating an interactive dialog if the validated order encounters a condition that requires input from the customer during the processing; displaying the interactive dialog on a dynamic UI in the web browser; receiving the customer input via the interactive dialog; and transmitting the customers input to the server for additional processing wherein, the customer is engaged.

Embodiments of the present invention may include a computer-implemented method for providing an interactive real time wireless carrier approval and ordering program for wireless products. The method capable of performing at least the following steps of: providing a database of available wireless products from a plurality of wireless service providers for selection by a customer; receiving an order with an indication of a selected wireless product from the available wireless products via a web browser; storing the order in a database; validating the stored order with one or more validation routines; transmitting the validated order to one or more systems for processing; generating an interactive dialog if the validated order encounters a condition that requires input from the customer during the processing; displaying the interactive dialog on a dynamic UI in the web browser; receiving the customer input via the interactive dialog; and transmitting the customers input to the server for additional processing wherein, the customer is engaged.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 is an illustration of a UI displaying the validation results from an order processed by a RTOP that was submitted with a pre-approval code according to one embodiment of the invention.

FIG. 5 is an illustration of a UI displaying an activated and validated order processed by RTOP according to one embodiment of the invention.

Figure 10:
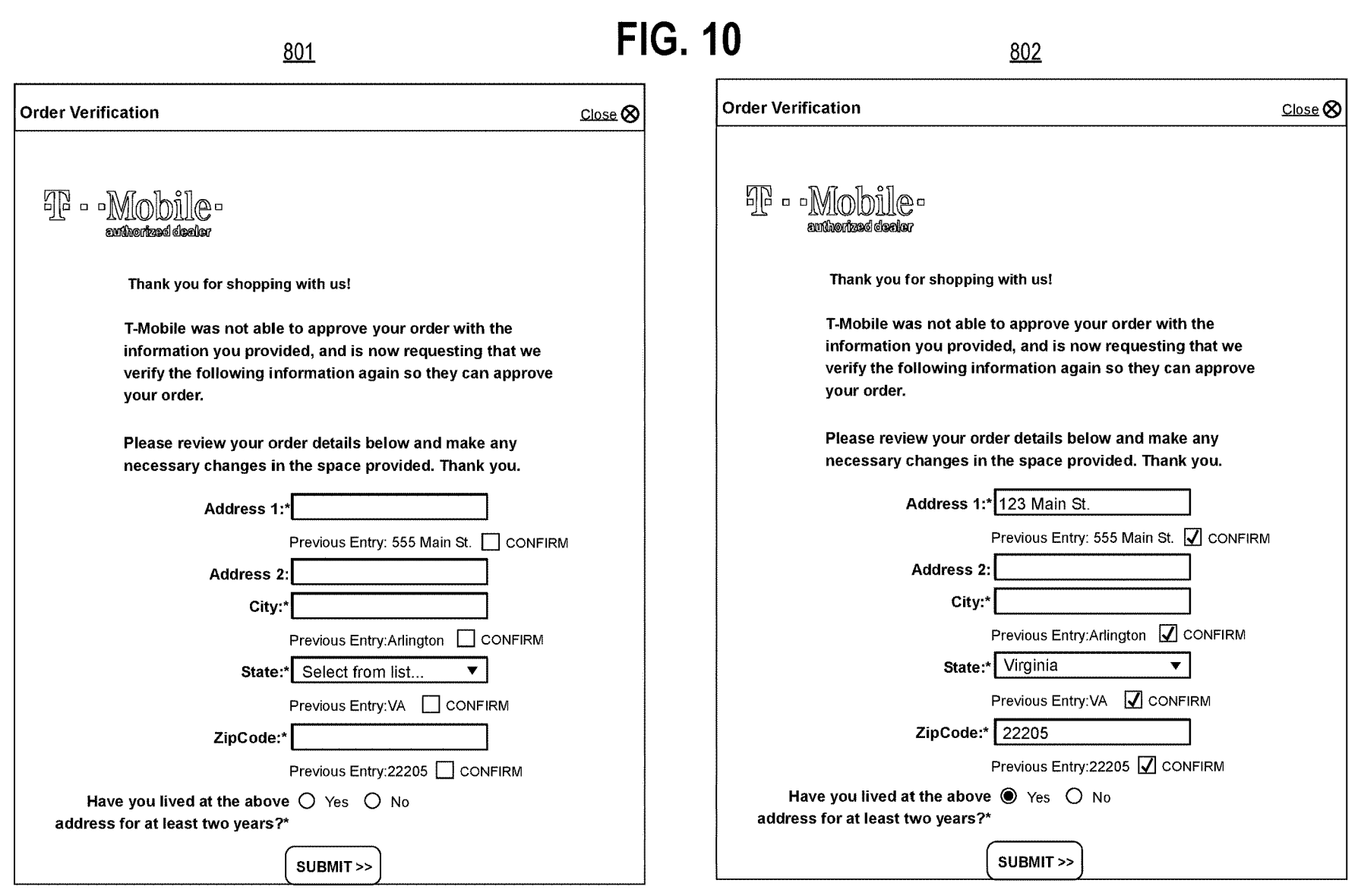

FIGS. 6-12 are sample dynamic Active JavaScript and XML (AJAX) driven RTOP UI in which a customer order is submitted with incorrect information according to one embodiment of the invention.

Figure 1:
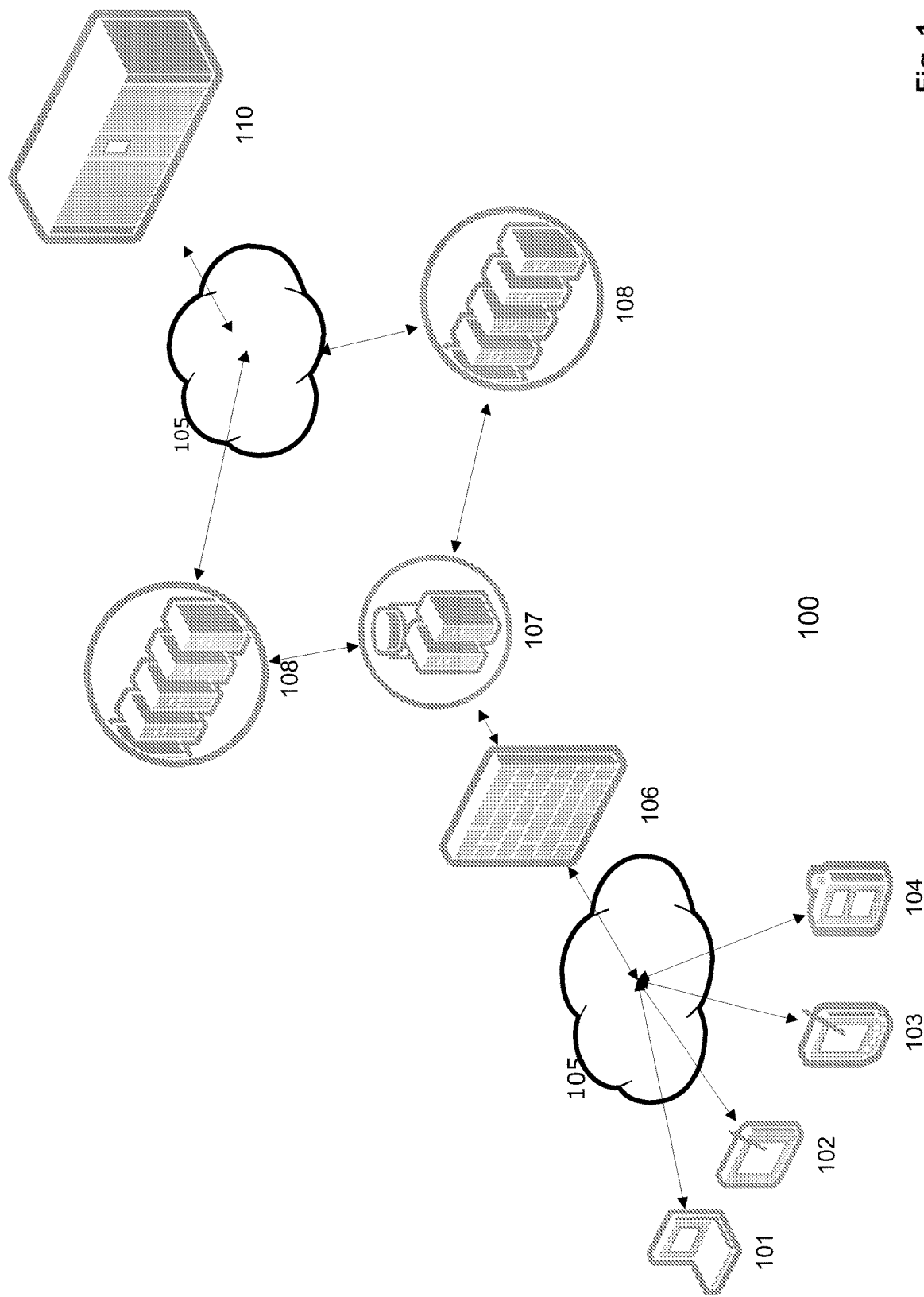
FIG. 1 is an illustration of the exemplary system architecture of the platform according to one embodiment of the invention.
Figure 2:
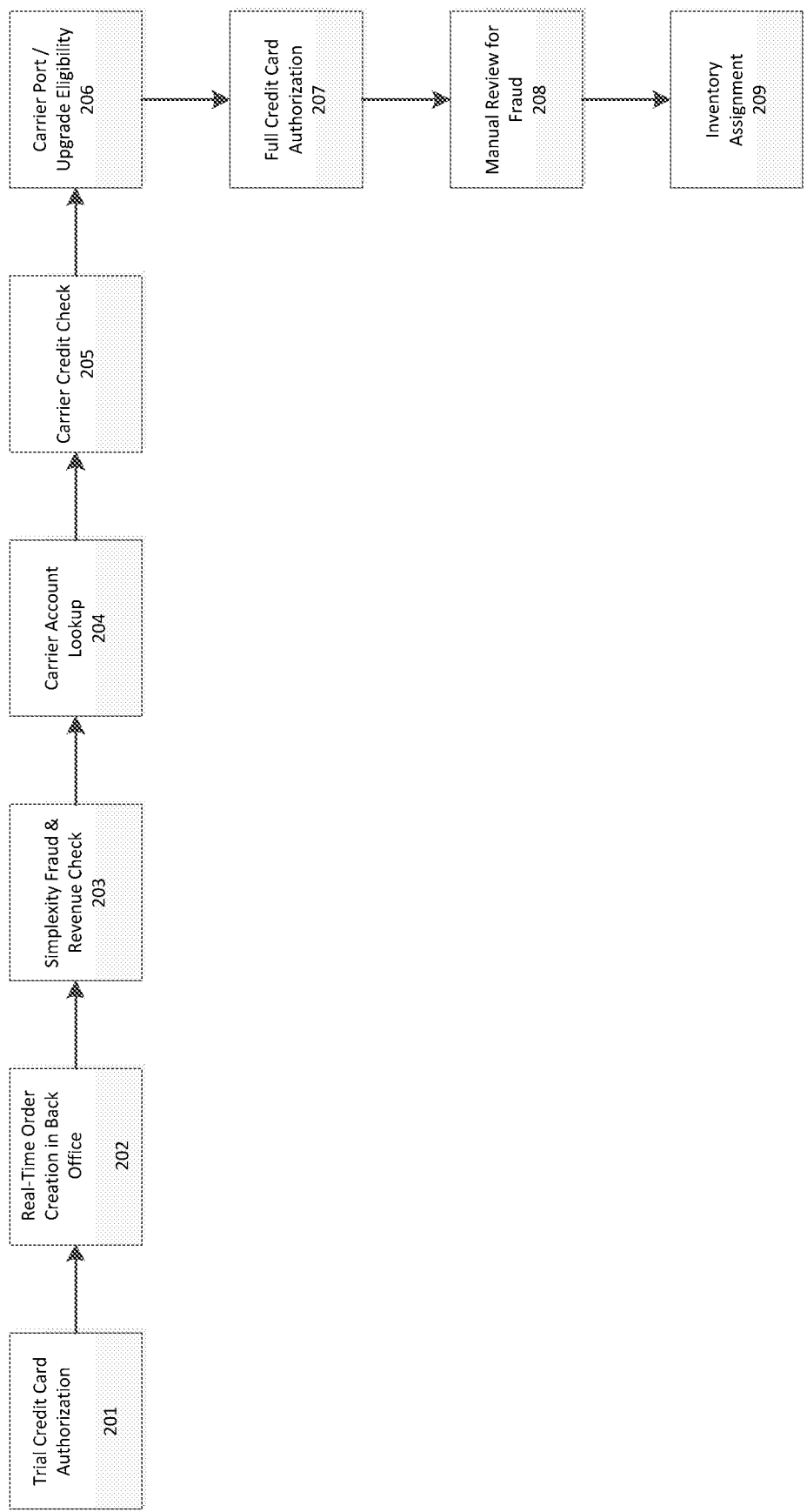
FIG. 2 is an illustration of a high level flow chart of an exemplary process for ordering and activating a new wireless device according to one embodiment of the invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION OF THE INVENTION

As used herein, AJAX is a development technology for developing Web applications that adapts a client side script and an Application and/or web server 107 to asynchronously exchange data using the HTTP protocol. AJAX provides for the creation of interactive web applications that makes web pages feel more responsive by exchanging small amounts of data between a web page and an application and/or web server 107 and making page user interface updates incrementally, without having to reload the entire page. By using AJAX, a richer and more dynamic Web application user interface can be created. Its low response times and high availability can approach the properties of a local desktop application. AJAX is a part of the JavaScript 1.3 standard and is supported by most mainstream browsers.

As used herein, a "User Interface (UI)" may be a singular application, or alternatively a collection of inter-related apps, running on one or more servers (not shown) that is accessed over a network such as the Internet 105 or an intranet (not shown), with a web browser, which displays content to a user, accepts user input, and provides output by generating web pages which are transmitted via a network such as the Internet 105 or an intranet (not shown). Newer implementations utilize Hyper Text Markup Language version 5 (HTML 5), Java, AJAX, Adobe Flex, Microsoft .NET, or similar technologies to provide real time control in a separate program, eliminating the need to refresh a traditional HTML based web browser. A UI may also mean a computer software that is hosted in a browser-controlled environment (e.g. a Java applet) or coded in a browser-supported language (such as JavaScript, combined with a browser-rendered markup language like HTML) and reliant on a common web browser to render the application executable.

As used herein, a "database" may be a relational database, flat file database, relational database management system, object database management system, operational database, data warehouse, hyper media database, post-relational database, hybrid database models, RDF database, key value database, XML database, XML store, text file, flat file or other type of database.

As used herein, "authentication" refers to any authentication and access control mechanisms employed for granting access to computer systems, including but not limited to usernames, passwords, user identification number, biometric data, facial characteristics, voice, tokens or other objects from a single-sign-on (SSO) or identity server, two-factor authentication, multi-factor authentication or other conventional authentication mechanism.

As used herein, a "workflow" broadly refers to a path and/or order of steps in which RTOP may perform a task. The order or number of steps may vary in different embodiments.

As used herein, the term "real time" may include, but is not limited to, immediate, rapid, not requiring operator intervention, automatic, and/or programmed. Real time may include, but is not limited to, measurements in femtoseconds, picoseconds, nanoseconds, milliseconds, as well as longer, and optionally shorter, time intervals.

As used herein, a "rules engine" may include an expert system which is operable to produce an output as a function of a plurality of rules. A rules engine, in one embodiment, may include an expert computer system which utilizes and builds a knowledge base developed in the form of business rules and/or formulas to assist the user in decision-making.

As used herein, a "customer" or "user" refers, generally, to a user or CSR operating a client device with a UI that is engaged in, is engaged in, or will engage in a communication session (referred herein, generally, as a "visit"), typically via standard web browser software, with one or more servers in the platform.

As used herein, the term "Internet" shall incorporate the terms "Intranet", "computer network" and "Extranet" and any references to accessing the Internet 105 shall be understood to mean accessing an Intranet and/or Extranet and/or publicly accessible computer networks and private computer networks, as well. Examples of the Internet 105 may also include an internal network such as an Ethernet or a Virtual Private Network (VPN), one or more wireless networks, a wired network, an extranet, an intranet, a PSTN, a private network, or any other communication network.

In some embodiments, the platform 100 may be implemented using a rules engine to automate business rules for ordering and activation of a Wireless Product. In some embodiments, the business rules for ordering and activation of a Wireless Product may be implemented as a real-time workflow using a rules engine. In some embodiments, the platform 100 may utilize an interactive dynamic AJAX-driven UI to provide a customer with the current status of an order in the workflow. In some embodiments, the platform 100 may ensure that all required steps in an online submitted customer order occur in rapid succession while a customer is engaged. In some embodiments, the platform 100 may provide interactive UI to allow customers to provide information, make decisions, and/or trigger additional steps in the workflow. In some embodiments, the platform 100 may provide customers with an opportunity to automatically correct or adjusting existing wireless plans, if they already have accounts with wireless carriers for a selected wireless product. In some embodiments, Wireless Products may be sold with or without a wireless carrier service. In some embodiments, the platform 100 may interface with multiple wireless carrier systems for risk assessment, service provisioning, wireless device activation, and other transactions. In some embodiments, one or more of these transactions may be performed manually by CSRs or agents of a provider of wireless carrier. Further, embodiments of the invention do not require store personnel to be trained to use ordering and activation systems associated with multiple carriers In some embodiments, the platform 100 may be implemented via one or more client devices, including but not limited to personal computers 101, notebooks 101, netbooks 101, tablets 102, cell phones 104, iPADs 102, PDAs 103 or other electronic device capable of supporting a browser. Each client device may be well known to those skilled in the art and may include a display, a central processor, a system memory, and a system bus that couples various system components including the system memory to the central processor unit. The system bus may be any of several types of bus structures including a memory bus or memory controller, a peripheral bus, and a local bus using any of a variety of bus architectures. The structure of system memory may be well known to those skilled in the art and may include a basic input/output system (BIOS) stored in a read only memory (ROM) and one or more program modules such as operating systems, application programs and program data stored in random access memory (RAM). The computers may also include a variety of interface units and drives for reading and writing data and a database for storing data. The computing devices may run an Operating System (OS). The OS may include a shell, for providing transparent user access to resources such as application programs. The OS may include a kernel, which provides essential services required by other parts of OS and application programs. The services provided by the kernel include memory management, process and task management, disk management, and I/O device management. The OS may be the Linux Operating system, Microsoft Operating system or other operating systems.

Each computing device may be able to communicate with another computer via a network using a network interface, which is coupled to the system bus. The network may be an external network such as the Internet 105. The client devices that implement the platform 100 may be implemented on a variety of hardware platforms or implemented in a variety of software environments.

Applications running on or accessing these computing devices may include a browser, a rules engine, a workflow application or other application required by the platform 100. A browser may include program modules and instructions for enabling a World Wide Web (WWW) client to send and receive network messages to the Internet 105. The browser may use well known protocols, such as Hyper Text Transfer Protocol (HTTP) messaging to enable communication with other computing devices.

In some embodiments, the platform 100 may be implemented using a net-centric Application Service Provider (ASP) model, which includes but may not be limited to a model wherein an application may be hosted on an application and/or web server 107, which can be accessed by the Internet 105 or a network. In one alternative, the present invention may be embodied in a computer program, typically an application program running on one or more application and/or web servers 107. Although the illustrative embodiment will be generally described in the context of an application running on an application and/or web server 107, otherwise known as an ASP model, those skilled in the art will recognize that the present invention may be implemented in any distributed computing environment including local area networks, wide area networks, as well as the Internet 105. The network may include permanent connections, such as wire or fiber optic cables, or temporary connections made through telephone or wireless communications. The distributed computing environments may include the Internet 105 with networks representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), and others.

In some alternatives, the platform 100 may operate in a model using a browser to access one or more computers via AJAX or using communication protocols, such as the Simple Object Access Protocol (SOAP) protocol. In some embodiments, MCWP may provide comprehensive reporting capabilities, which may provide an insight in profitability and category mix. In some embodiments, MCWP may provide a customer with a multi-channel capabilities to purchase Wireless Products pre-approved online or at a retail store or club and delivered to the customers home, picked-up at a retail store or club or shipped to a retail club or store if it is not available at the retail store. In some alternatives, the MCWP may optimize Wireless Products rate plans and features.

Figure 4:
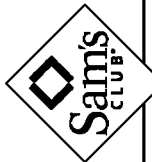
FIG. 4 is an illustration of a UI displaying a completed validated order processed by RTOP according to one embodiment of the invention.
Figure 6:

In another embodiment, a rules engine framework may be used to implement one or more workflows for the ordering and activation processing of Wireless Products. Now referring now to FIG. 4, there is shown a high level flow chart of an exemplary RTOP workflow for ordering and activating a Wireless Product according to one embodiment of this invention. A customer that may or may not have selected a customized Wireless Products bundle with or without a pre-approval may access a Portal to purchase Wireless Products using a browser accessible from a client device. In some alternatives, the customer may receive a special offer for a Wireless Product from a wireless carrier or other Wireless Product vendor. In some alternatives, the customer may be prompted with an authentication dialog. The customer may select one or more Wireless Products for purchase. The customer may opt to purchase other options associated with a selected Wireless Product. The customer may enter information, such as a first name, an optional middle initial, a last name, an address, an email address, customer's date of birth, a daytime phone number, a home phone number, Social Security number and driver's license (or state ID) number into RTOP fields. RTOP may then provide the customer with an option to review or select additional Wireless Products. After the user has selected the desired wireless product, RTOP may then provide the user with a UI for payment and for check out and submission of the order. In some alternatives of the invention, the payment methods may include cash, check, credit card, debit card, and/or any other financial instruments. In some alternatives of the inventions, the customer may pay for selected items using payment services such as PayPal or Google. The RTOP process may begin after a Wireless Product order received from a customer may have been validated using well known order validation routines for electronic commerce. In some alternatives, validation may include verifying the address of the customer or the address of the order using well known address validation routines. In some alternatives, the address validation routines may be internal proprietary address validation routines. In some alternatives, address validation routines may include the interaction with one or more external third-party validation systems. In some embodiments, RTOP may display interactive UI and messages on a dynamic UI available to the user, while the user is engaged. In some alternatives, the dynamic UI may use technologies, such as AJAX or other interactive web technology to refresh or update the dynamic UI data or submit data to the portal. In some alternatives, RTOP may use notifications displayed on the UI to inform the customer to remain engaged during the order processing, inform the customer that a third party system may require additional information from them and to remain engaged, or inform them that the order processing is complete and they may disengage from the online store front. For example, in FIGS. 4, 5, 6 and 7, there are illustrated exemplary dynamic UI screens, according to one embodiment of the invention that indicate to a customer that RTOP has received an order, the status of the order and informing the customer to remain engaged through the completion of order processing. In some alternatives, a customer order may be transmitted to RTOP from a virtual inventory program.

At step 201, RTOP may perform a trial credit card authorization based on the payment information or credit card information provided in the Wireless Product order. In some alternatives of the invention, the trial authorization may be for at least $0 or $1. In some alternatives, the trial authorization may be determined by wireless carrier guidelines. In some alternatives, the trial authorization may be for the entire amount of the sale. In some alternatives, the trial authorization criteria may be determined by guidelines provided by the credit card type, and/or the combination of the carrier and activation type selected. In some alternatives, if the authorization is successful, RTOP may assign a unique identifier, such as an order number to the transaction. In some alternatives, RTOP may display the unique identifier on a dynamic AJAX-driven UI. In some alternatives, the unique identifier may also be displayed on a conventional UI. In some alternatives, the unique identifier may be printed, emailed or transmitted via SMS to the customer, a third party or a CSR. If the trial authorization is unsuccessful, RTOP may provide the customer with an interactive UI to allow the customer to provide additional information, make decisions, and/or trigger additional steps within RTOP. For example, the customer may be provided with an opportunity to correct and/or update order information, enter an alternative form of payment or correct the payment information initially entered.

In step 202, RTOP may replicate the order details in Real-Time to one or more back office systems 108. In some alternatives, the back office systems 108 may be merchandising systems, provisioning systems, fulfillment systems, customer care systems, fraud detection systems, security systems, billing systems, wireless carrier systems, service provisioning systems, wireless device activation systems, payment processing systems, address verification systems, Encryption Systems or other transactions systems. In some alternatives, RTOP may interface with these systems via a web service or other type of service known in the art.

In step 203, RTOP may route the order to at least one back office system 108 or third party system 109, such as a Risk Management system to perform a fraud and revenue check on the customer or order prior to routing the order to the wireless carrier activation system. In some embodiments, RTOP may include sophisticated order fraud management capabilities including access to third party identity and credit data providers to obtain further information related to fraud prevention about the customer and/or the customer's order. In some embodiments, RTOP may develop a fraud risk score for each order processed based on a number of factors, including matches to a negative file, previously fraudulent orders, velocity filters, order cost, identity verification data, and credit card authorization data. The fraud risk score may be used to determine the need for additional automated or manual order validation, or alternatively, to rejection of the order. In some alternatives, all fraud score parameters are customizable and have real-time metrics reporting availability that display the frequency that a particular fraud trigger is activated, and the frequency with which an order is canceled or shipment is blocked due to a fraud trigger. In some alternatives, if the order fails a fraud check, RTOP may accept the order and send the customer a cancellation notice in a few days after the order has been placed. In some alternatives, the cancellation order may be sent via US mail, email or other notification mechanism designated by the customer. In some alternatives, if the order fails a revenue check, RTOP may generate a notice, such as a Fair Credit Reporting Act (FCRA) notice and send the notice to the customer. In some alternatives, the notice may be sent via US mail, email or other notification mechanism designated by the customer. In some alternatives, RTOP may provide the customer with an interactive UI dialog, if additional information is required for the fraud and revenue check. In some alternatives of the invention, the fraud and revenue checks may be modified or bypassed where a customer may have already received a pre-approval notice from MWCP. In some alternatives, if the order passes the automated fraud and revenue checks, RTOP may route the order to a back office system 108 or a third party system 109 for further processing.

Optionally, in step 204, RTOP may use information provided by the customer while submitting the order to lookup the customer's wireless carrier account. In some alternatives, this information may include, but is not limited to the customer account username, password, telephone number, credit card number or other authentication information.

Figure 7:
Figure 8:
Figure 12:
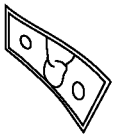

In step 205, RTOP may perform a wireless carrier risk assessment as part of the further processing of the order from step 203. The wireless carrier risk assessment may include a credit check on the order using the information submitted by the customer, according to the rules established for the selected Wireless Product carrier. RTOP may interface with multiple third party systems 109, such as wireless carrier risk assessment systems associated with one or more wireless service providers, as well as, interface with wireless device activation services associated with one or more wireless service providers. In some alternatives, this interface may be via a business-to-business (B2B) interface that may be adapted to operate with any wireless service provider using various wireless device technologies including, for example, CDMA, GSM, and iDEN. If the order fails the wireless carrier assessment, RTOP may provide the customer with an interactive UI to allow the customer to provide additional information, make decisions, and/or trigger additional steps within RTOP. In some alternatives, RTOP may notify the customer that the order is being routed to a third party system as illustrated in FIG. 7. In some alternatives, if the order fails the credit check, RTOP may provide the customer with an interactive dialog UI as illustrated in FIG. 8, to allow the customer to provide additional information, make decisions, and/or trigger additional steps within RTOP. For example, the customer may be provided with an opportunity to correct and/or update order information, enter an alternative form of payment or correct the payment information initially entered. In some alternatives, the wireless carrier may return and indicator, which includes but is not limited to an overall decision for the Wireless Product request, such as "Pending", "Approved", "Denied", "Deposit required", "Manual Review", "Credit Unknown", "Data Error." In some alternatives, the wireless carrier may return an indicator, which may include a credit class/status, credit application number or number of lines approved with potential line level deposit requirements. In some alternatives, a CSR may access a third-party wireless carrier system and submit the data manually. After the third-party wireless carrier system provides a response, RTOP may import this data from the third-party system using any conventional means.

In step 206, if the order passes the carrier risk assessment checks in step 205, RTOP may perform an eligibility check, such as an upgrade eligibility check, a number port eligibility check, a number port transfer check, and an existing account lookup for one or more customers on the order. In some alternatives, if the order includes adding a new line to a new account, adding a new line to an existing account or a rate plan conversion and the addition of a new line, RTOP may allow the customer to port their existing number. In other examples, if the order includes an upgrade for a primary, secondary or other line, RTOP may allow the customer to port their existing number and/or keep their existing plan. In further examples, if the order includes a new line and/or upgrade for an individuals, small business, government or corporate user, RTOP may allow the customer to port their existing number and/or keep their existing plan. In some alternatives, if the order fails the credit check, RTOP may provide the customer with an interactive dialog UI as illustrated in FIG. 7 to allow the customer to provide additional information, make decisions, and/or trigger additional steps within RTOP. For example, the customer may be provided with an opportunity to correct and/or update order information, enter an alternative form of payment or correct the payment information initially entered. In some alternatives, if the order passes the eligibility check, RTOP may query one or more back end system 108 to determine if the items in the order are available for fulfillment of the order as illustrated in step 209.

In step 207, RTOP may perform a full credit card authorization for the total amount of the order. If the authorization for the order is unsuccessful, RTOP may request that the customer provide an alternate form of payment via an interactive dialog UI. In some alternatives of the invention, additional forms of payment include, but are not limited to a check, another credit card, a debit card, and/or any other financial instrument. In some embodiments, the customer may pay for the selected wireless items using payment services such as PayPal or Google Checkout. In some alternatives, the RTOP system may auto-fail an order after several unsuccessful attempts to authorize the transaction with a credit card, debit card, other financial instrument or payment services. In some alternatives, the RTOP system may auto-fail an order if it encounters an unexpected condition or other generic condition where the workflow has been programmed to auto fail the transaction. After the customer provides an alternative form of payment, RTOP will attempt another authorization for the total amount of the order. If this authorization for the order is partially successful, RTOP may request that the customer provide an additional form of payment via an interactive dialog UI. In some alternatives of the invention, additional forms of payment include, but are not limited to a check, another credit card, a debit card, and/or any other financial instrument. In some embodiments, the customer may pay for the selected wireless items using payment services such as PayPal or Google Checkout. If the additional form of payment is a credit card or a debit card, RTOP may perform a full credit card authorization as described in step 207. If the additional payment is other than a credit card or a debit card, RTOP may authorize the order using conventional means and release of the order for fulfillment.

In step 208, RTOP may perform a manual review of the order for fraud. In some alternatives, after a successful credit card authorization in step 207, the order may be subjected to a manual review for fraud. In some alternatives, if the order does not require a fraud or manual review check and/or the order passes the fraud or manual review check, RTOP may route the order to step 209. In some alternatives, if the order does not pass a fraud or manual review check, RTOP may provide the customer with an interactive UI as illustrated in FIG. 8 to allow the customer to provide additional information, make decisions, and/or trigger additional steps within RTOP.

In step 209, RTOP may query one or more back office systems 108, such as the Inventory System, an inventory management system or an order fulfillment system for reserving the inventory. In some alternatives, if items in the order are not available in inventory, RTOP may perform a manual review for fraud as illustrated in step 208 or RTOP may hold the order until it receives an indication that the selected wireless product is available. When RTOP receives an indication from the back office system 108 that the selected wireless product is available, RTOP may perform a full credit card authorization as illustrated in step 207. After the order is reserved in the back office systems 108, the back office systems 108 may set the expectation on shipping and delivery for the order, and may provide the customer with a UI displaying an anticipated shipping and/or delivery date for the order. In some alternatives, if the order cannot be reserved in the back office systems 108, RTOP may provide the customer with an interactive UI as illustrated in FIG. 8 that may allow the customer to provide additional information, make decisions, and/or trigger additional steps within RTOP.

After step 209 is complete, RTOP may provide the customer with an option to disengage from RTOP. In some alternatives, the customer may be provided with a message displayed on a UI, such as messages informing the customer that the order is ready for shipment and thanking the user for using RTOP and/or visiting a Wireless Product retail store. In some alternatives, the customer may be provided with an interactive UI that may guide the customer with disengaging from RTOP. For example, in FIG. 34, there is illustrated an exemplary dynamic UI screens, according to one embodiment of the invention that indicate to a customer that the order is complete and the wireless product is ready for shipment.

In some alternatives, the interactive UI may allow customers to provide information, make decisions, and/or trigger additional steps in RTOP. In some alternatives, the interactive UI may provide functionality to display custom messages, allow customers to resubmit new and/or previously entered data, chat with a customer service representative online, call a customer service representative via a telephone, automatically cancel the order online and/or cancel the order via a telephone call with a customer service representative. Interactive UI in RTOP may arise from the carrier risk assessment, step 205, port eligibility checks, step 206, manual review and/or fraud review, step 207, RTOP being unable to reserve the selected wireless product in the inventory management system, step 208.

In some alternatives, interactive UI from the carrier risk assessment, step 205, may include interactions such as 'Contact Us' interactions, 'Deposit' interactions and/or 'Verify/Resubmit' interactions. For example, in FIG. 8, there are illustrated an exemplary dynamic UI screens, according to one embodiment of the invention that indicate to a customer that RTOP system may require additional information. Additional examples of 'Contact Us' interactions may include: a message to customer to check back in x Hours; asking a Customer to Contact the provider; asking a customer to contact the wireless carrier & give them an option to indicate when this has been completed, for example, "I've contacted my carrier, Continue" button; an existing account message with a prompt to contact Us; and asking a customer to contact us or cancel the order. Examples of 'Deposit' interactions may include: "Accept Deposit T&Cs, Collect Deposit;" "Accept Spending Limit & Continue to STOCK-1;" "Accept Deposit T&Cs, Accept Sprint ASL, & Collect Deposit;" "Option to Cancel Deposit Lines, Pay Deposits, Cancel Entire Order;" "Option to Get Approved Lines Only, or Cancel Order;" and "Option to Get Approved Lines Only, Cancel Deposit Lines, Pay Deposits, Cancel Entire Order." Examples of 'Verify/Resubmit' interactions may include: "Re-enter SSN and resubmit;" "Re-enter Address and resubmit;" "Collect Additional Prior Address & Resubmit with that Address;" "Re-Enter Name and/or SSN;" "Re-Enter Date of birth and resubmit;" "Re-enter PIN and resubmit;" "Re-enter DL # & resubmit;" "Re-Enter Port Info & Resubmit or chat if don't have account #;" "Re-Enter Port Account & Resubmit;" "Re-Enter Account info or call us;" "Re-Enter Mobile # & Resubmit."

In some alternatives, interactive UI from the port eligibility checks, step 206, may include 'Port Eligibility Resubmit' interactions such as "Re-enter SSN and resubmit;" "Re-enter Address and resubmit;" "Collect Additional Prior Address & Resubmit with that Address;" "Re-Enter Name and/or SSN;" "Re-Enter Date of birth and resubmit;" "Re-enter PIN and resubmit;" "Re-enter DL # & resubmit;" "Re-Enter Port Info & Resubmit or chat if don't have account #;" "Re-Enter Port Account & Resubmit;" "Re-Enter Account info or call us;" "Re-Enter Mobile # & Resubmit." In some alternatives of the interactive UI may provide warnings about an existing account or the outcomes of the port check eligibility, step 207. Examples of existing account interactive UI may include a warning about a discount program, such as an Instant Savings Discount (ISD) program; if the ISD is available, merge & prompt for acceptance, or chat with agent to change order/cancel; an offer to upgrade at an increased cost or cancel order; an offer or option to get new number, shop online for another carrier (& cancel), or contact another rep; and/or run a process to validate a customer order and determine whether a Wireless Product selected in the order meets certain criteria for the selected rate plans & either update order or ask them to contact us (be able to test showing rev price). Examples of Eligibility Outcomes that may use case workflows in RTOP may include: telling a customer that the order was approved (Delay processing 1-2 days); telling a customer that they will be eligible on X date, and we will process then; telling a customer that they're not eligible, ask if they want SMS notification when they will be eligible for an upgrade; telling a customer that we are processing eligible lines right away & will process additional line when eligible; telling a customer which lines they're eligible for, with continue or cancel; and telling a customer which lines they're approved for, with continue or cancel.

In some alternatives, manual review and/or fraud review, step 207, may include interaction dialogs, such as 'Reviewing Order,' 'Check back in X Mins/Hrs,' 'Chat/Click to Call.'" Examples of Chat & Click to call may include: Configurable individually on/off by use case/outcome & carrier; Configurable to queues by use case/outcome & carrier; Chat available based on staffing/agent availability; Click to call times available based staffing/agent availability; Examples of 'Cancel' interaction dialogs may include Configured as present or not by use case/outcome & carrier; When present configurable to be automatic cancel or launch chat; When chat, configurable to queues by use case/outcome & carrier; Also present in harder to find part of site? In some alternatives, RTOP being unable to reserve the selected wireless product in the inventory management system, step 208, may include the following interaction UI. Reserve Specific Inventory, Tell Customer Expected Delivery Date; Hold Spot for Bulk Inventory, Tell Customer Expected Delivery Date; Thank you for your order, Hold Spot for Future Inventory, Expected Ship Date (popular/slight delay); Ask customer to contact us (C&A Rep helps them pick another phone); Generic out of stock message, with click to chat.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A computer-implemented method in a distributing computing system for providing an interactive real time validation based in interactions with third party wireless carrier systems, the method comprising:
   receiving an order with an indication of a selected wireless product from a database of available wireless products;
   interfacing with a risk assessment third party system for validation of the order;
   receiving data from the risk assessment third party system in response to providing the risk assessment third party system information associated with the order;
   determining if the order passed a risk assessment based on the data received from the risk assessment third party system;
   triggering an interactive dialog to be displayed on a User Interface (UI) requiring input in response to the order not passing the risk assessment;

validating the order with one or more validation routines based on the data received from the risk assessment third party system;

transmitting the validated order to a wireless carrier third party system for processing, in response to validation of the order with the one or more validation routines;

triggering the interactive dialog to be displayed on the UI in response to a condition detected by the wireless carrier third party system, the interactive dialog that requires input from a customer during the automated processing, the interactive dialog displays a dynamically created customized message and is dynamically generated based on a type of the condition detected; and transmitting customer input received via a user interface presenting the interactive dialog continuously to the risk assessment third party or wireless carrier third party system for additional processing, wherein, the customer is engaged during the method.

2. The computer-implemented method of claim 1, wherein the one or more validation routines are one or more of: risk assessments, port eligibility checks, fraud, unable to reserve the selected wireless product, other errors and combinations thereof.

3. The computer-implemented method of claim 1, wherein the user interface includes one or more of: custom interactions, resubmission interactions, chat interactions, click to call interactions, auto cancel interactions, cancel via chat interactions, other interactions and combinations thereof.

4. The computer-implemented method of claim 1, wherein continuously engaged is a single user session.

5. The computer-implemented method of claim 1, wherein method is performed in real time.

6. The computer-implemented method of claim 1, further comprising a subsequent interactive dialog providing the interactive dialog to a dynamic user interface; receiving the customer input via the interactive dialog; and transmitting the customer input continuously to one or more third party systems for additional processing, for any subsequent encounter of a condition.

7. A system for providing an interactive real time validation from wireless carriers, the system comprising:

a memory coupled to a processor;

the processor operable to execute a program;

the program stored in the memory and executable by the processor, the program being operable to perform the method of:

receive an order with an indication of a selected wireless product from a database of available wireless products;

interface with a risk assessment third party system for validation of the order;

receive data from the risk assessment third party system in response to providing the risk assessment third party system information associated with the order;

determine if the order passed a risk assessment based on the data received from the risk assessment third party system;

trigger an interactive dialog to be displayed on a User Interface (UI) requiring input in response to the order not passing the risk assessment;

validate the order with one or more validation routines, based on the data received from the risk assessment third party system;

transmit the validated order to a wireless carrier third party system for processing, in response to validation of the order with the one or more validation routines;

trigger the interactive dialog if the validated order encounters a condition detected by the wireless carrier third party system, the interactive dialog that requires input from a customer during the automated processing, the interactive dialog displays a dynamically created customized message and is dynamically generated based on a type of the condition detected; and transmit customer input received via a user interface presenting the interactive dialog continuously to one or more third party systems for additional processing, wherein, the customer is engaged during the method.

8. The system of claim 7, wherein the one or more validation routines are one or more of: risk assessments, port eligibility checks, fraud, unable to reserve the selected wireless product, other errors and combinations thereof.

9. The system of claim 7, wherein the user interface includes one or more of: custom interactions, resubmission interactions, chat interactions, click to call interactions, auto cancel interactions, cancel via chat interactions, other interactions and combinations thereof.

10. The system of claim 7, wherein continuously engaged is a single user session.

11. The system of claim 7, wherein method is performed in real-time.

12. The system of claim 7, further comprising a subsequent interactive dialog providing the interactive dialog to a dynamic user interface; receiving the customer input via the interactive dialog; and transmitting the customer input continuously to the one or more third party systems for additional processing, for any subsequent encounter of a condition.

* * * * *